(12) United States Patent
Parker et al.

(10) Patent No.: US 7,582,147 B1
(45) Date of Patent: Sep. 1, 2009

(54) COMPOSITE POWDER PARTICLES

(75) Inventors: Donald S. Parker, Winter Springs, FL (US); Louis G. MacDowell, Satellite Beach, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 694 days.

(21) Appl. No.: 11/208,122

(22) Filed: Aug. 18, 2005

Related U.S. Application Data

(60) Provisional application No. 60/603,520, filed on Aug. 19, 2004.

(51) Int. Cl.
*C09D 5/08* (2006.01)
*C23F 11/00* (2006.01)
*B22F 1/00* (2006.01)
*B22F 9/00* (2006.01)
*C22B 1/14* (2006.01)

(52) U.S. Cl. ............... 106/14.05; 106/14.11; 106/14.21; 106/14.25; 106/14.33; 106/14.39; 106/14.44; 106/623; 23/313 R; 75/228; 75/245; 75/247; 75/255

(58) Field of Classification Search ............... 106/14.05, 106/14.21, 14.11, 14.25, 14.33, 14.39, 14.44, 106/623; 75/228, 245, 247, 255; 23/313 R
See application file for complete search history.

(56) References Cited

U.S. PATENT DOCUMENTS

| | | | |
|---|---|---|---|
| 2,877,126 A * | 3/1959 | Whitby | ......................... 106/403 |
| 3,881,911 A | 5/1975 | Cheney et al. | |
| 3,974,245 A | 8/1976 | Cheney et al. | |
| 4,118,527 A | 10/1978 | Patel | |
| 4,506,485 A * | 3/1985 | Apostolos | ..................... 52/515 |
| 4,632,309 A | 12/1986 | Reimer | |
| 4,705,560 A | 11/1987 | Kemp, Jr. et al. | |
| 4,728,545 A * | 3/1988 | Kurauchi et al. | ............. 427/409 |
| 4,812,212 A * | 3/1989 | Dimond et al. | ............. 205/734 |
| 4,865,252 A | 9/1989 | Rotolico et al. | |
| 4,882,650 A * | 11/1989 | Maher et al. | .............. 361/321.4 |
| 5,082,741 A | 1/1992 | Taira et al. | |
| 5,100,509 A | 3/1992 | Pisecky et al. | |
| 5,126,104 A | 6/1992 | Anand et al. | |
| 5,292,411 A * | 3/1994 | Bartholomew et al. | ....... 205/731 |
| 5,341,562 A * | 8/1994 | Furuya et al. | ................ 205/731 |
| 5,364,511 A * | 11/1994 | Moreland et al. | ......... 204/196.3 |

(Continued)

FOREIGN PATENT DOCUMENTS

JP      2000-80309 A   *   3/2000

(Continued)

OTHER PUBLICATIONS

Machine Translation of JP2000-80309A (Mar. 2000).*

(Continued)

*Primary Examiner*—Anthony J Green
(74) *Attorney, Agent, or Firm*—Randall M. Heald; Thomas W. Leffert

(57) ABSTRACT

A liquid coating composition including a coating vehicle and composite powder particles disposed within the coating vehicle. Each composite powder particle may include a magnesium component, a zinc component, and an indium component.

19 Claims, 2 Drawing Sheets

U.S. PATENT DOCUMENTS

| | | | |
|---|---|---|---|
| 5,419,976 A | | 5/1995 | Dulin |
| 5,431,795 A | * | 7/1995 | Moreland et al. ........... 252/503 |
| 5,632,100 A | | 5/1997 | Hansen |
| 5,650,060 A | * | 7/1997 | Huang et al. ................ 205/730 |
| 5,789,106 A | * | 8/1998 | Rosenmeier et al. .......... 429/33 |
| 6,033,553 A | * | 3/2000 | Bennett ...................... 205/730 |
| 6,254,704 B1 | | 7/2001 | Laul et al. |
| 6,309,995 B1 | * | 10/2001 | Maher et al. ................ 501/138 |
| 6,440,332 B1 | * | 8/2002 | Geer et al. .................. 252/512 |
| 6,471,851 B1 | * | 10/2002 | Bennett ...................... 205/730 |
| 6,503,576 B1 | | 1/2003 | Russo et al. |
| 6,540,823 B1 | * | 4/2003 | Seo et al. .................... 106/436 |
| 6,627,065 B1 | | 9/2003 | MacDowell et al. |
| 6,702,870 B2 | | 3/2004 | Hultman et al. |

FOREIGN PATENT DOCUMENTS

JP        2005-305303 A   *  11/2005

OTHER PUBLICATIONS

Koenig, "Agglomeration Methods & Equipment" pp. 1-16, © 2001 Hosokawa Micron Int'l. Inc.

Praxair Surface Technologies Powder Solutions Catalog pp. 1-15, © 2000.

* cited by examiner

COMPOSITE POWDER PARTICLES

CROSS REFERENCE TO RELATED APPLICATIONS

This application claims priority to U.S. Provisional Patent Application Ser. No. 60/603,520, filed Aug. 19, 2004 and titled "AGGLOMERATED AND SINTERED POWDER PARTICLE," which is commonly assigned and incorporated by reference herein.

STATEMENT OF GOVERNMENT INTEREST

The invention described herein was made by an employee of the United States Government and may be manufactured and used by or for the Government of the United States of America for governmental purposes without the payment of any royalties thereon or therefor.

TECHNICAL FIELD OF THE INVENTION

The present invention relates generally to powders and in particular the present invention relates to composite powder particles.

BACKGROUND OF THE INVENTION

Corrosion of metal structures, e.g., steel structures, embedded in substrates, e.g., of concrete, for re-enforcing the substrates for use, e.g., as highway bridge infrastructure, building structures, etc, is a problem. Coatings have been developed for the reduction of corrosion of the embedded metal structures. These coatings are typically applied as liquids to an external surface of a substrate in which the metal is embedded. The liquid applied coatings act to provide galvanic protection to the embedded metal.

The liquid coating typically includes two or more metals, such as magnesium and zinc, dispersed in a liquid coating vehicle, such as an inorganic silicate, where the two or more metals remain conductive after the coating dries. In operation, electrical connectivity between the coating and the embedded metal structures induces an electrical current that provides cathodic protection to the embedded metal structures with the coating acting as a sacrificial anode. The coatings are normally applied using methods similar to standard paints, e.g., brushing, rolling or spraying.

The coatings are often formed by dry mixing powders of the two or more metals together and then adding them to the coating vehicle. However, this can produce an inhomogeneous mixture of the two or more metal powders that when applied to a surface, results in inhomogeneous electrical connectivity between the coating and the embedded metal structures.

For the reasons stated above, and for other reasons stated below which will become apparent to those skilled in the art upon reading and understanding the present specification, there is a need in the art for alternatives to existing coatings for reducing corrosion of metal structures embedded in substrates.

SUMMARY

The above-mentioned problems with existing coatings for reducing corrosion of metal structures embedded in substrates and other problems are addressed by the present invention and will be understood by reading and studying the following specification.

For one embodiment, the invention provides a composite powder particle having a zinc component and a magnesium component.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, chemical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
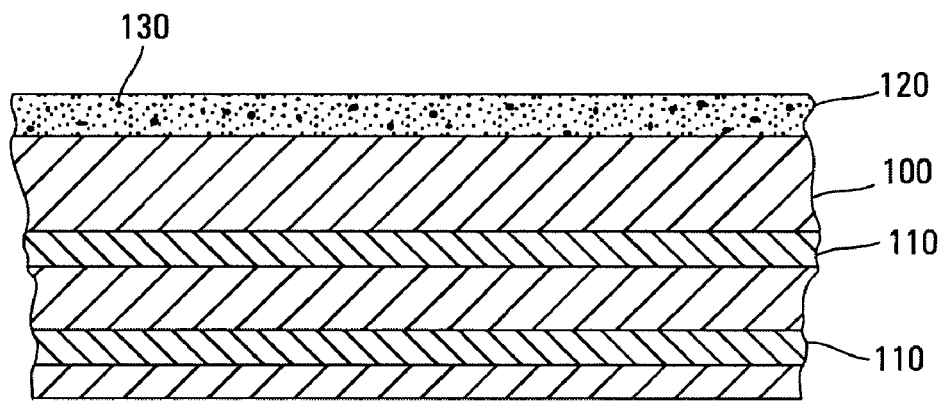
FIG. 1 is a cross-section of a substrate with embedded metal structures, according to an embodiment of the invention.

FIG. 1 is a cross-section of a substrate 100, such as concrete, with embedded metal structures 110, such as reinforcing steel bars, according to an embodiment. An external surface of the substrate 100 is coated with a galvanic coating 120. Coating 120 is formed by dispersing a powder of composite metal powder particles 130 in a liquid coating vehicle, such as an inorganic silicate. Coating 120 is then applied to substrate 100 using methods similar to those used for applying standard paints, e.g., brushing, rolling, or spraying, and is allowed to dry.

For one embodiment, composite metal particles 130 include two or more metal components, such as zinc, magnesium, and indium. The intrinsic electrochemical properties of the two or more metal components combine at the particle level so that coating 120 cathodically protects metal structures 110 in substrate 100 by corroding sacrificially to metal structures 110. Having powder particles with combined electrochemical properties of two or more metal components acts to reduce mix segregation and results in a more uniform electrochemical barrier for protecting metal structures embedded in substrates than can be obtained with conventional dry mixing of bulk metal components.

Figure 2:
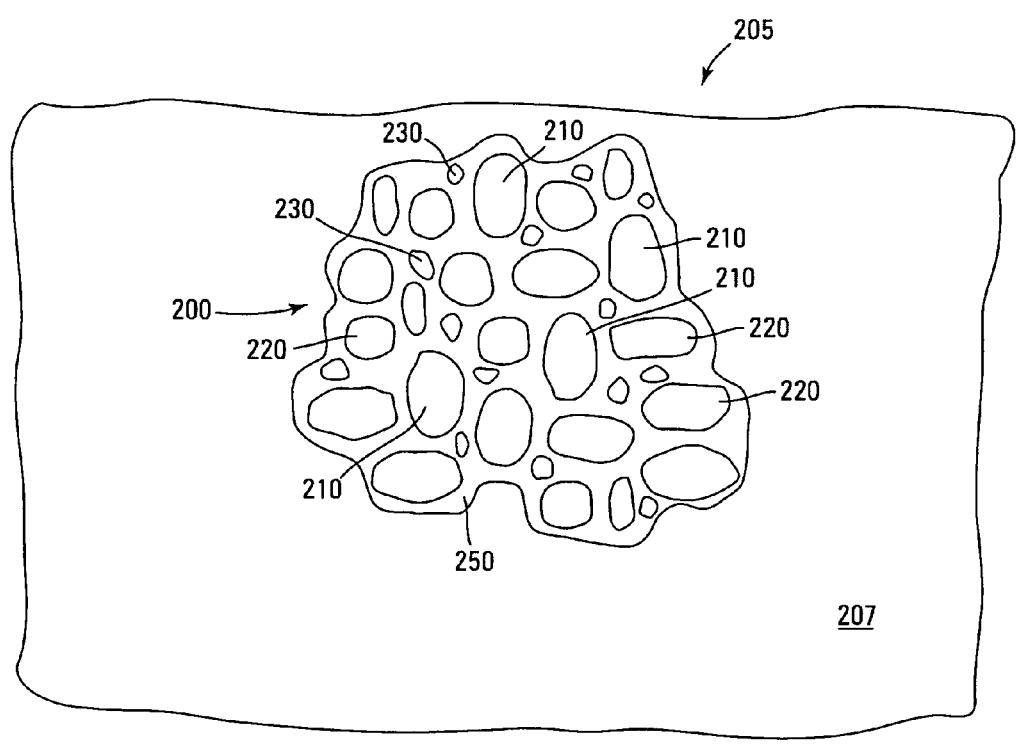
FIG. 2 is an enlarged view of an embodiment of a composite particle, according to another embodiment of the invention.

FIG. 2 is an enlarged view of a composite particle 200 as a portion of a liquid coating 205, according to another embodiment. Note that composite particle is disposed in a liquid coating vehicle 207. For one embodiment, composite particle 200 includes a metal component (or sub-particle) 210, such as zinc, a metal component (or sub-particle) 220, such as magnesium, and a metal component (or sub-particle) 230, such as indium. For another embodiment, metal component 230 is optional, and composite particle 200 includes metal components 210 and 220. For some embodiments, metal component 230 is a catalytic metal that helps maintain the galvanic activity of the applied coating by distributing the protection activity evenly throughout the coating. For other embodiments, composite particle 200 may include a plurality of catalytic metal components.

For one embodiment, the average size of composite particle 200 is about 325 mesh (44 micron) and includes about 60 to about 80 percent zinc, about 20 to about 40 percent magnesium and about 0.0 to about 0.8 percent indium by volume. For another embodiment, the size distribution of composite particles 120 in coating 200 or coating 120 of FIG. 1 is about 80 percent −200+325 mesh (74−44 micron), with the remaining about 20 percent at most about 170 mesh (88 microns) and at least about 400 mesh (37 microns).

For one embodiment, the composite particles are substantially spherically shaped and are formed by agglomeration and sintering, a process that is known in the art. In one exemplary embodiment, powdered forms of metal components 210, 220, and 230, each have particles of a substantially spherical shape and nominal size of about $\frac{1}{10}$ to about $\frac{1}{5}$ that of composite particle, e.g., composite particles 120 of FIG. 1 or composite particle 200 of FIG. 2. The powder of each metal component may be formed by melting coarse raw material stock of that metal component, e.g., using vacuum induction. The molten metal is then atomized, producing a plurality of metal droplets carried by a gas flow. The molten metal droplets are then quenched, e.g., cryogenically, to produce that powdered metal component having substantially spherically shaped particles. Alternatively, the powder of each metal component may be formed by ball milling the coarse raw material stock of that metal component.

Each of the powdered metal components can then be screened to size by injecting that powder into an airflow to create an aerosol that is forced through vibrating screens to filter the particles carried by the air to a predetermined size. The particles of the respective powdered metal components, metal components 210, 220, and 230, are bound to each other with a binder material, such as binder material 250 of FIG. 2, to form composite particles, e.g., using an agglomeration process. The composite particles may be additionally subjected to heat-treatment, e.g., in an inert atmospheric furnace, to sinter the composite particles and drive off any remaining binder material. Suitable binders include film binders, such as water, solutions, dispersions, powders, silicate, gel, oil, alcohol, clay, starch, lubricant, such as oil, glycerin, stearate and wax, used to reduce friction and induce flow of the material.

One suitable agglomeration technique is spray-drying agglomeration that is known in the art and essentially involves partially drying the individual powdered metal components in a drying chamber or the like. The partially dried powders are directed to a fluid bed, where the particles of the respective powdered metal components bind together to form a porous agglomerate (or a powder including porous composite particles). The size and structure of the composite particles can be controlled by selection of the drying temperature.

Another suitable agglomeration technique is rewet agglomeration that is known in the art and essentially involves wetting the powdered metallic components, e.g., by steam or a water mist, in an agglomerating chamber that may also include a rotating disc to further condition and stabilize the agglomerate. The agglomerate is dried in a vibrating fluid bed, followed by size classification, e.g., using screens. Undersized particulates are returned to the agglomerating chamber. Control of the wetting rate and subsequent drying determines the size of the composite particles forming the agglomerate.

Another suitable agglomeration technique is fluid-bed agglomeration that is known in the art and essentially involves fluidizing the powdered metallic components with hot air and spraying powdered metallic components with a binder liquid substantially simultaneously. This causes particles of the individual powders to adhere to each other, thus producing dried agglomerate (or a powder including the composite particles). Control of air velocity and wetting rate determines the size of the composite particles forming the agglomerate. The process produces agglomerate having of narrow size distribution of composite particles that are screened for size.

After agglomeration, the agglomerate (or a powder including the composite particles) may be sintered. A suitable sintering process known in the art essentially involves pre-sintering the agglomerate by heating the agglomerate to a temperature above the vaporization temperature of the organic binder used for agglomeration to remove any residual organic materials. Heating the agglomerate to a temperature corresponding to about $\frac{1}{2}$ the melting point of the metal component having the lowest melting temperature, or less, and maintaining the temperature for about 7 to about 10 hours then sinters the agglomerate, i.e., each of the composite particles. For example, an agglomerate containing indium would be heated to about $\frac{1}{2}$ of the melting temperature of indium e.g., 313.88° F./156.6° C., so sintering should be performed at no greater than about 157° F./78.5° C. for about 7-10 hours. For an agglomerate of magnesium and zinc, the agglomerate is heated to $\frac{1}{2}$ the melting temperature of zinc. Sintering fuses the component particles of the composite particle, by forming diffusion bonds, that acts to densify and strengthen the composite particle. This enables the agglomerate to have sufficient strength to endure handling and stress associated with deposition through a spray type apparatus, so that the agglomerate can flow freely when carried by a coating vehicle through the spray type apparatus.

For one embodiment, alloying metal components 210, 220, and 230 together and forming the composite particles from the resulting alloy form the composite particles. For another embodiment, the alloy is formed from metal components 210 and 220 only. Specifically, powders of metal components are mixed together in the appropriate ratios, as defined above. The mixture is then melted, e.g., in a crucible or a furnace, as a part of a casting process and is allowed to solidify to form an ingot of the composite metal (or alloy). The solidified composite is subsequently pulverized into a powder, e.g., by crushing and/or ball milling, that includes the composite particles, such as composite particles 120 of FIG. 1 or composite particle 200 of FIG. 2.

For one embodiment, a powder that includes the composite particles, such as composite particles 120 of FIG. 1 or composite particle 200 of FIG. 2 and formed according to the methods described above are injected into a flow of a liquid coating vehicle, such as is commonly done with conventional paint spray systems. Spraying of liquid coatings is discussed in U.S. Pat. No. 6,627,065, issued Sep. 30, 2003, entitled "LIQUID GALVANIC COATINGS FOR PROTECTION OF EMBEDDED METALS," which patent is commonly assigned, the entire contents of which are incorporated herein by reference. The powder may be carried by nitrogen, argon, or clean, dry, oil free compressed air through a flow passage, such as provided by a hose, connected to a spray gun. The composite particles disburse in the air/liquid stream exiting a nozzle of the spray gun, and the spray gun is moved across a surface of a substrate, such as substrate 100 in FIG. 1.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A liquid coating composition comprising:
   a coating vehicle; and
   composite powder particles disposed within the coating vehicle;
   wherein each composite powder particle comprises a magnesium component and a zinc component; and
   wherein about 80 percent of the composite particles are about 44-74 microns and about 20 percent of the composite particles are at most about 88 microns and at least about 37 microns.

2. The liquid coating composition of claim 1 further comprises one or more catalytic metal components.

3. The liquid coating composition of claim 1, wherein the coating vehicle is an inorganic silicate.

4. The liquid coating composition of claim 1, wherein each composite powder particle is an alloy of magnesium and zinc.

5. The liquid coating composition of claim 1, wherein each composite powder particle is an agglomeration of magnesium and zinc.

6. A method of forming a liquid coating composition, comprising:
   forming composite particles, each composite particle including a zinc component and a magnesium component and having an average size of about 44 microns; and
   adding the composite particles to a liquid coating vehicle.

7. The method of claim 6, wherein forming composite particles comprises combining particles of zinc and magnesium using an agglomeration process to form combined zinc and magnesium particles.

8. The method of claim 7 further comprises sintering the combined zinc and magnesium particles.

9. The method of claim 8, wherein sintering comprises heating the combined zinc and magnesium particles to about ½ of a melting temperature of zinc and maintaining the temperature of the combined zinc and magnesium particles at about ½ the melting temperature of zinc for about 7 to about 10 hours.

10. The method of claim 6, wherein forming composite particles comprises:
    forming an alloy of zinc and magnesium; and
    pulverizing the alloy.

11. The method of claim 8, wherein sintering comprises heating the combined zinc magnesium, and indium particles to about ½ of a melting temperature of indium and maintaining the temperature of the combined zinc, magnesium, and indium particles at about ½ the melting temperature of indium for about 7 to about 10 hours.

12. The method of claim 6, wherein the coating vehicle is an inorganic silicate.

13. A method of forming a liquid coating composition, comprising:
    forming composite particles, each composite particle including a zinc component and a magnesium component; and
    the composite particles in a liquid coating vehicle;
    wherein each particle further comprises an indium component.

14. The method of claim 13, wherein forming composite particles comprises:
    forming an alloy of zinc, magnesium, and indium; and
    pulverizing the alloy.

15. The method of claim 13, wherein forming composite particles comprises combining particles of zinc, magnesium, and indium using an agglomeration process to form combined zinc, magnesium, and indium particles.

16. The method of claim 15 further comprises sintering the combined zinc, magnesium, and indium particles.

17. A liquid coating composition comprising:
    a coating vehicle; and
    composite powder particles disposed within the coating vehicle;
    wherein each composite powder particle comprises a magnesium component, a zinc component, and an indium component.

18. The liquid coating composition of claim 17, wherein each composite powder particle is an alloy of magnesium, zinc, and indium or an agglomeration of magnesium, zinc, and indium.

19. The liquid coating composition of claim 17, wherein the coating vehicle is an inorganic silicate.

* * * * *